Oct. 5, 1943. G. D. ARNOLD Re. 22,383

ART OF PRESERVING VALUABLE ELEMENTS OF ORGANIC MATERIAL

Original Filed Dec. 29, 1939 3 Sheets-Sheet 1

INVENTOR
GERALD D. ARNOLD

BY
Wheeler, Wheeler & Wheeler
ATTORNEYS

Oct. 5, 1943. G. D. ARNOLD Re. 22,383

ART OF PRESERVING VALUABLE ELEMENTS OF ORGANIC MATERIAL

Original Filed Dec. 29, 1939. 3 Sheets-Sheet 2

INVENTOR
GERALD D. ARNOLD
BY
Wheeler, Wheeler & Wheeler
ATTORNEYS.

Oct. 5, 1943. G. D. ARNOLD Re. 22,383
ART OF PRESERVING VALUABLE ELEMENTS OF ORGANIC MATERIAL
Original Filed Dec. 29, 1939 3 Sheets-Sheet 3
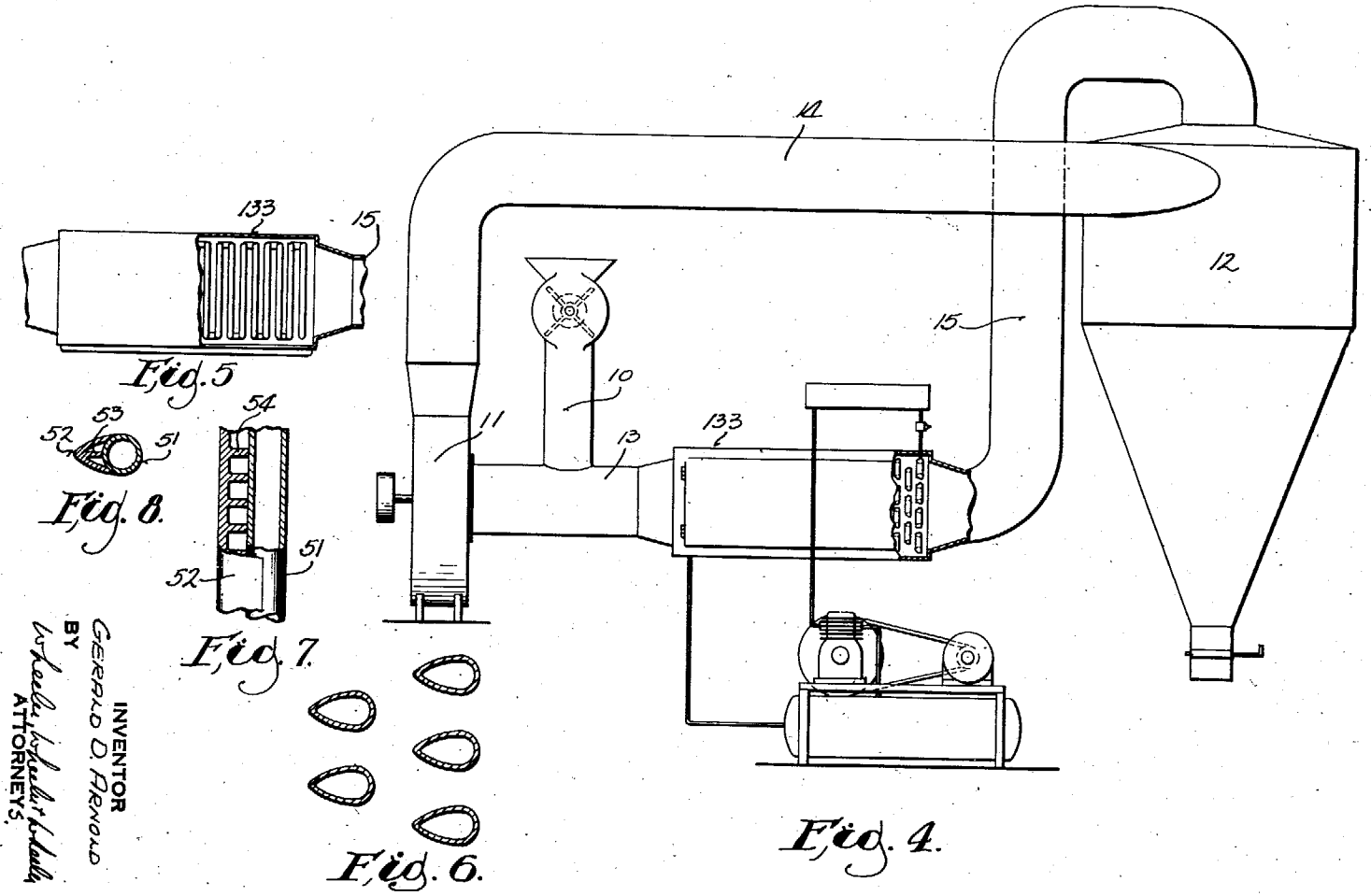
INVENTOR
GERALD D. ARNOLD
BY
Wheeler, Wheeler & Wheeler
ATTORNEYS.

Reissued Oct. 5, 1943

Re. 22,383

UNITED STATES PATENT OFFICE 22,383

ART OF PRESERVING VALUABLE ELEMENTS OF ORGANIC MATERIAL

Gerald D. Arnold, Wauwatosa, Wis.

Original No. 2,266,292, dated December 16, 1941, Serial No. 311,639, December 29, 1939. Application for reissue August 17, 1942, Serial No. 455,133

33 Claims. (Cl. 99—2)

This invention pertains to improvements in the art of preserving valuable elements of organic materials in dry storage. The present application is a companion to my application Serial No. 231,110 filed Sept. 26, 1938, now Patent No. 2,241,654, granted May 13, 1940.

The major objects of the present invention are the same as those specified in the companion application above identified, viz; the preservation of color and vitamin A content of herbaceous stock foods during extended storage periods. Specifically, the invention primarily pertains to the removal of what may aptly be termed "stored heat." In addition, the present invention seeks to improve the apparatus and method for greater efficiency not only for the retention of valuable ingredients in stock food, but also for the dissipation of heat from fertilizers and other materials.

Heat, sufficient to cause degeneration, may be imparted to organic material by the atmosphere or it may be generated during the process of cutting, grinding or dehydration. If this heat is allowed to remain in the material during extended storage periods, it promotes fermentation, oxidation, and enzymetic and bacterial action to the detriment of the product.

The present invention, like that disclosed in the companion application above identified, contemplates a process of refrigeration which involves the delivery of the material to be cooled, in a subdivided condition, into a pre-cooled gaseous stream to be entrained and conveyed by the chilled gas while giving up its heat to the gas.

The present invention seeks to improve the efficiency of this operation by recirculating the gas with the objective not merely of conserving its residual capacity for heat absorption, but with the further objectives of reducing difficulties having to do with condensation on the refrigerating coils and also difficulties involved in the inseparable component of dust which is carried with the recirculated air and which tends to cling to the refrigerating coils if these are moist or wet with condensation.

A further object of the present invention is to provide a means for assuring that relatively heavy particles of roughage in the material to be cooled may be cooled to substantially the same temperature as finer particles or dust.

Another object of the invention is to maintain the device in operation substantially at full capacity and with minimum power requirements by regulating the input of material and the speed of operation of the fan inversely as the temperature of the gases at the point where they are separated from the material, which has been pneumatically conveyed and chilled. I propose to feed the material to the pneumatic stream as rapidly as the stream can adequately chill the material, and if the temperature differential between the material and the air at the point of discharge has been so reduced as to impair cooling efficiency I propose, by automatic means, to reduce the rate of feed until the proper differential can be maintained. Since more air is needed for pneumatic propulsion than is necessary for the performance of the cooling function, I am also able to save power, when less material is fed, by reducing the speed of the fan, and it is one of the purposes of the present invention to accomplish this object automatically and concurrently with the reduction in the rate of feed, the same automatic controls being employed to accelerate the rate of feed and the rate of fan operation when the temperature differential between the feed and the air at the point of discharge exceeds the predetermined value. While subject to automatic controls, as above indicated, it is my purpose to maintain the volume and rate of air flow and the volume and rate of material movement substantially constant under normal conditions.

Other objects of the invention will be apparent to those skilled in the art upon examination of the following disclosure.

In the drawings:

Fig. 4 is a diagrammatic view of still another embodiment of my invention with parts broken away to best disclose the inner construction.

Fig. 5 is a front elevation partly in section of a cooling chamber disclosing an alternate arrangement of enclosed cooling coil.

Fig. 6 is a cross sectional view of cooling coils which I prefer to employ in the device shown in Fig. 4.

Fig. 7 is a side view partly in section of an alternate cooling coil adapted for use in the device as shown in Fig. 4.

Fig. 8 is a cross sectional view of the cooling coil disclosed in Fig. 7.

Like parts are identified by the same reference characters throughout the several views.

Figure 1:
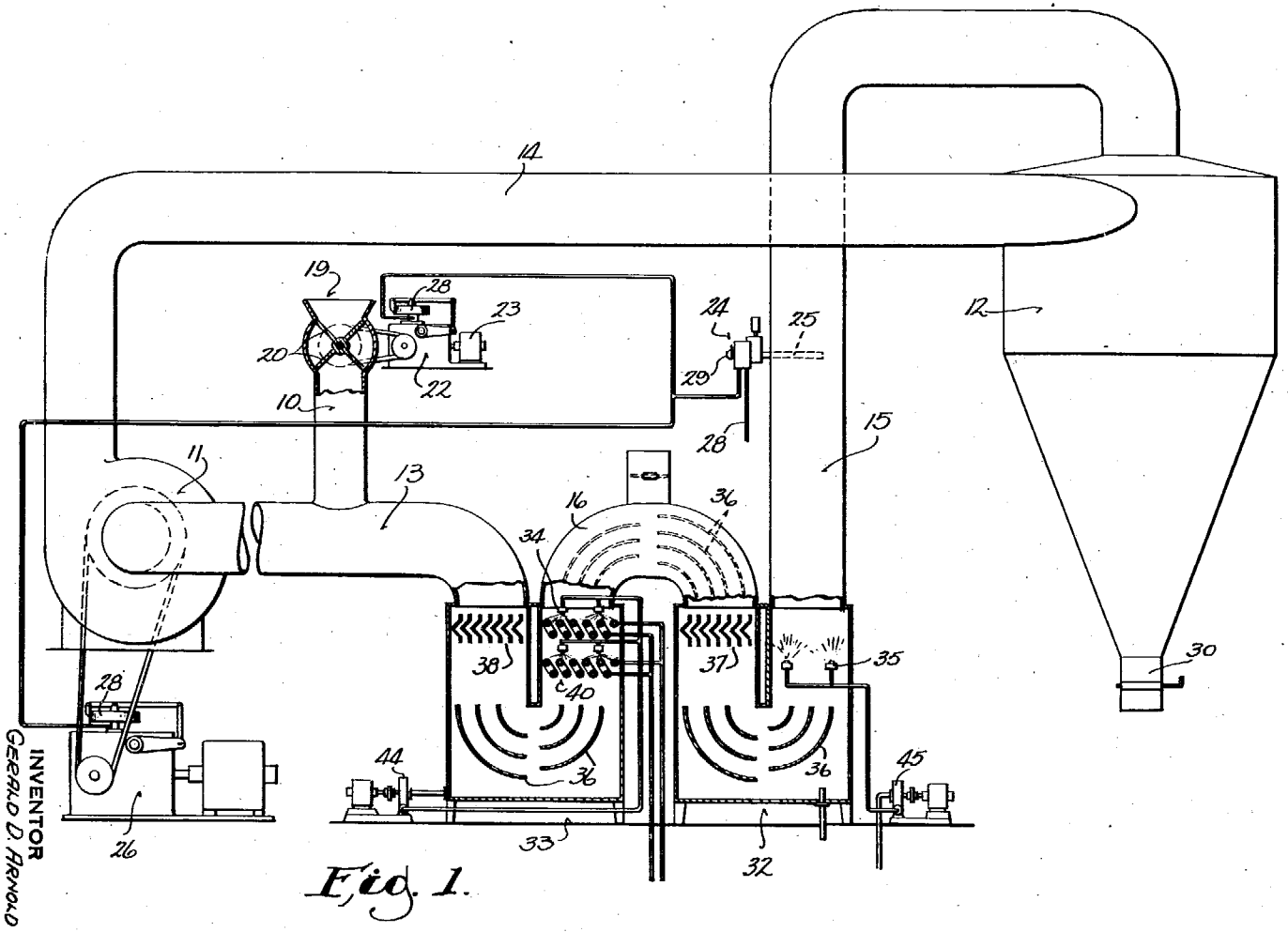
Fig. 1 is a diagrammatic view partly in front elevation and partly in section of a pneumatic separating device having my invention incorporated therein.

Fig. 1 discloses a preferred embodiment of my invention wherein a pneumatic stream is circulated by a blower 11 through a closed circuit comprising conduit 14, separator 12, conduit 15, air washer unit 32, refrigerator unit 33 and conduit 13. A material inlet or feed pipe 10 leads into conduit 13 and is provided with a metering device, illustrated by blades 20, to allow material to be fed into the stream of air which has been previously cooled by passage through refrigerating chamber 33. The rate of feed delivery is responsive to temperature changes in another part of the circuit, preferably in conduit 15, as will hereinafter be described. The pneumatic stream will be herein referred to as the air stream although other gas, such as $CO_2$ may be employed if desired.

My invention further provides for control of the speed at which the blower unit operates in response to air temperature changes in the same manner in which the rate of feed delivery is controlled. Control of both feed delivery and blower speed is effected through the employment of mechanism which is responsive to temperature changes in the air stream between the point at which material enters the stream and the point at which the air is discharged into the atmosphere, or re-cooling of the air takes place, as the case may be, depending upon whether an open or a closed circuit apparatus is employed.

In the closed system as shown in Fig. 1, a thermostatic control device 24 is employed to govern the rate at which material is fed into the air stream as well as the velocity or intensity of the stream. Control 24 has a heat responsive member 25 disposed within conduit 15 where it is actuated by the heat of the air stream after it is discharged from the separator and flows toward the recooling mechanism. While I prefer to locate control 24 as shown, I do not wish to so limit the scope of my invention, it being apparent that this control can be so placed as to be actuated by the stream before it enters the separator or even during the separating operation. Control 24 as herein disclosed is adapted to pneumatically regulate the operation of associated mechanism, but a control adapted to regulate associated hydraulic or electrical mechanism may be employed with equal success.

Compressed air from a source not shown is conducted by means of conduit 28 through control device 24 and thence to feed control unit 22 and to blower control unit 26. Unit 24 may be of the general type having regulating means 29. Units 22 and 26 may include constant speed motors adapted to drive associated mechanism through variable speed devices controllable by damper motors 28 which are pneumatically actuable.

I have found that in the cooling of comminuted and dehydrated material or the like, it is economically expedient to employ a closed circuit system wherein the material is fed into the air stream to commingle therewith, whereby the individual particles of said material may be separately cooled by reason of absorption of heat therefrom by the colder gas in direct contact therewith. During the cooling process, the material is simultaneously conveyed to a separator. The separated gas is then conducted to a cooling or refrigerating unit for removal of the absorbed heat. The re-cooled gas is then returned to the system. In localities where a source of cold water is available, still further economies may be gained by employment of the water spray method for cooling the gas, either as the sole cooling means or as an auxiliary means to be employed in connection with other means for artificial refrigeration.

Finely comminuted material may be sufficiently cooled by the apparatus above described in its passage through conduit 13, blower 11, conduit 14 and through the vertical path within the separator 12. When relatively coarse material is to be cooled, it may become necessary to increase the length of time during which the material is exposed to the cooled air in which case I incorporate a revolving drum 42, Fig. 3, between the point at which material is fed to the stream and the point at which it is separated therefrom. When the gaseous stream enters the drum, it expands with a resultant decrease in velocity. Light particles readily pass through the drum at decreased velocity, but the heavier particles requiring more buoyancy, drop to the bottom of the drum. As the drum revolves, vanes 43 transfer the heavy particles from the bottom to the top thereof, where they slide off the vanes and fall through the central portion of the drum. This retarding of the air stream adds to the efficiency of the device in the cooling of either coarse or fine material, because heavier particles which require more cooling, are subjected to the cool air for longer periods of time than are the lighter particles. Drum 42, while illustrated only in conjunction with the apparatus shown in Fig. 3, may be advantageously utilized in the devices shown in Figs. 1 and 4. I do not limit the use of the speed retarding drum either to any specific type of cooling apparatus nor to any specific location in respect to other elements in the circuit. It is apparent that the drum would be equally efficient in conduit 13 between the feed intake pipe and the blower 11.

Fig. 1 discloses an apparatus in which both closed chilling units and water spray are employed to cool and clean the air, while Fig. 4 discloses an apparatus in which the air washer has been eliminated. It is apparent that the regulation of the rate of feed and the regulation of the velocity of the air stream in response to temperature changes of gas within certain parts of the system is equally adaptable to either an open circuit or a closed circuit system. I do not wish to limit this phase of my invention to use in any particular type of system.

Referring more specifically to Fig. 1, the material is fed into the throat 19 of pipe 10, the rate of feed being regulated by a suitable metering device herein exemplified by rotatable blades 20 which are operatively connected to a source of power 22. Unit 22 preferably comprises a motor 23 and a variable speed mechanism intermediate the motor and the metering blades 20, and is responsive to the thermostatic control device 24. As the material is metered through the upper portion of pipe 10, the atmospheric air is excluded, or at least it is limited to a small amount which fills the interstices of the material as it is fed in. A pneumatic conveying current or air stream is constantly circulated throughout the device by blower 11 which runs continuously. As gravity and suction pull the material down pipe 10, it enters the air stream which is flowing through suction pipe 13 in the direction of blower 11. The finely divided material is quickly mixed with the air which is moving at a rapid rate and such mixture is accelerated by blower 11 as the material passes therethrough on its way to separator 12 through conduit 14. The air stream into which the material enters has been previously chilled by its passage through washing unit 32 and refrigerating unit 33 and hence there is a rapid heat transfer from the finely divided particles of material with a resultant rise in the temperature of said air as a result of such heat transfer. Because the finely divided particles of material are individually contacted and cooled by the chilled air, the heat transfer takes place very rapidly. Further heat transfer takes place within centrifugal separator 12 and, in fact, if conduit 14 is relatively short, much of the heat transfer may take place within this separator because of the relatively long length of travel of the vortex currents around the inner walls of the separator as compared to the length of travel in conduit 14. By the time the material is separated from the vortical currents within separator 12 to pass downwardly toward the discharge throat 30 through which it is removed, the temperature thereof has been substantially lowered and may be well below the temperature of the surrounding atmosphere. The rising vortical current within separator 12 from which the material has been substantially separated is discharged from the separator through conduit 15 and enters washing chambers 32 where it passes over a plurality of nozzles 35 from which cool water or refrigerant is sprayed. Dust which escaped the separator is largely precipitated on the floor of chamber 32 as the result of the washing or spraying to which the air stream is subjected in this chamber and it may be periodically removed therefrom. From chamber 32 the air stream is conveyed through conduit 16 to refrigerating chamber 33 where is passes directly over a battery of refrigerating coils 40 which are preferably under a continuous spray from nozzles 34 for the purpose of washing off any dust which might still be entrained within the air stream and which would otherwise tend to accumulate on the coils and heat insulate them. The water spray over the coils is circulated by pumps 44 and 45 and is a more efficient means of heat transfer from the air or gas current than if the air is sucked through the coils without the spray.

Nozzles 34 are preferably supplied with water by pump 44 which has an intake passage connected to the bottom of chamber 32 to provide re-circulation of the same water over the refrigerant coils. If desired, pump 44 may be thermostatically controlled by unit 24 in the manner in which pump 60 is controlled by unit 124. If conditions so warrant such an arrangement, pump 45 can also be controlled through unit 24.

In passing through chamber 32, conduit 16 and chamber 33, the air stream is aided in maintaining a uniform velocity with minimum eddy currents by the provision of multiple arcuate fins 36. Adjacent the outlet passage of chambers 32 and 33 are positioned water eliminators 37 and 38 to prevent free water from escaping. As the air stream leaves unit 33, it is substantially free from all entrained mist and is at the proper low temperature for starting a new cycle.

It is apparent that it is undesirable to produce a condition in an apparatus of this type wherein moisture-laden air might give up some of its moisture to comminuted material which has been preferably dehydrated. I have found from actual tests that even where the air stream is saturated, it does not impart moisture to the material. This is due primarily to the fact that the material as it is fed into the air stream causes a rise in temperature thereof and at an increased temperature the air is capable of holding more moisture. The particles of material are warmer than the air and because they are separated therefrom before being cooled to air temperature, they do not absorb moisture, and thus instead of the air stream imparting its moisture to the material, the converse is true and the material is to some extent dehydrated during contact with the cold air.

The exact location of the blower in relation to the other elements of the circuit is unimportant, but if it is undesirable to have the material go through the blower fan, the blower may be positioned in the return conduit 15, or between cooling chamber 33 and feed pipe 10.

Figures 2, 3, 9:
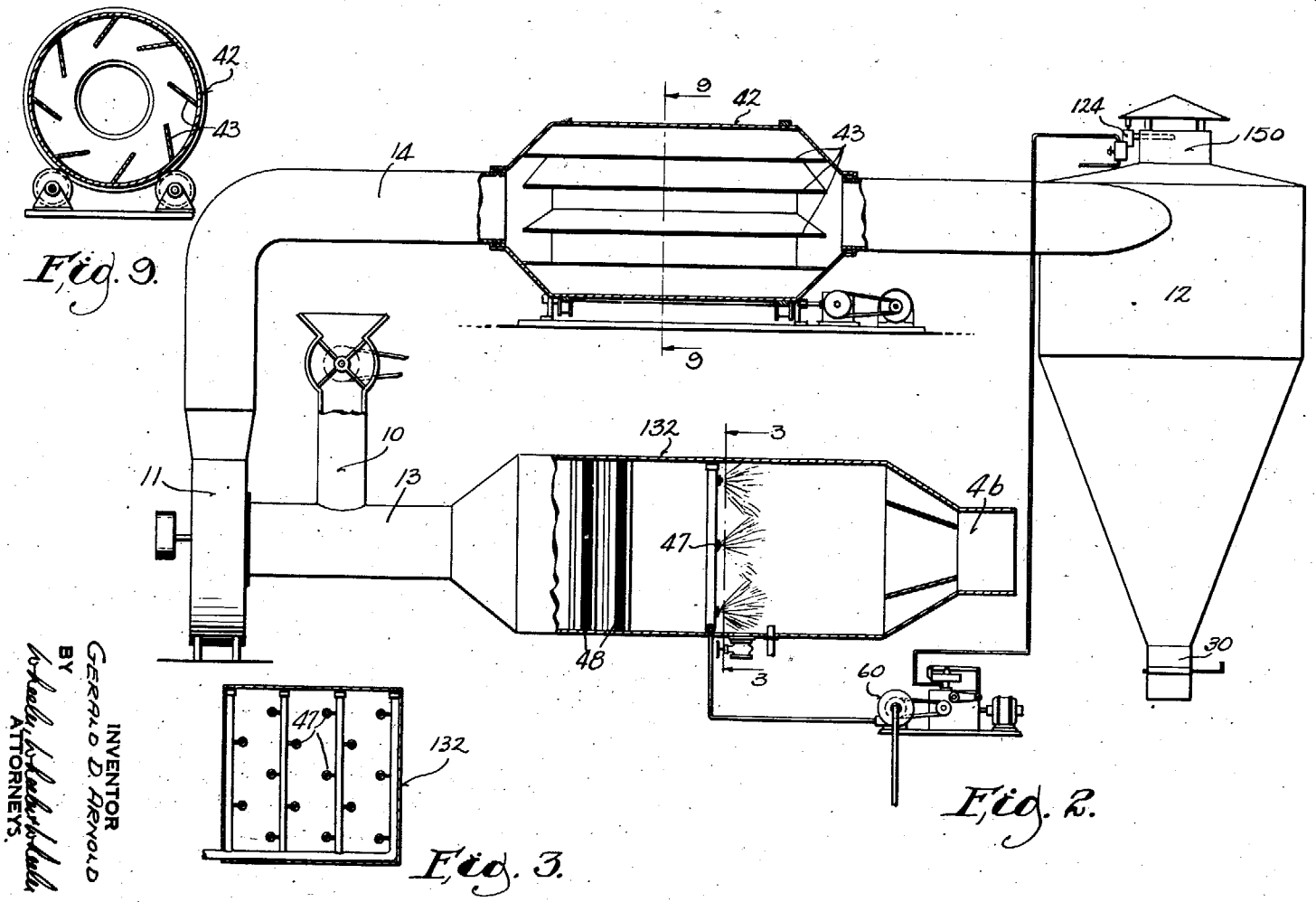
Fig. 2 shows diagrammatically an alternate embodiment of my invention.
Fig. 3 is a section taken along line 3—3 of Fig. 2.
Fig. 9 is a horizontal cross section through the revolving drum taken on line 9—9 of Fig. 2.

Fig. 2 discloses cooling and separating apparatus of the open type wherein fresh air is continuously drawn in, cooled, and employed to lower the temperature of the material which is intermixed therewith, after which it is expelled into the atmosphere instead of being re-cooled for subsequent use. In common with the apparatus disclosed in Fig. 1, this embodiment of the invention includes a feed pipe 10 leading into a conduit 13 which in turn leads to a blower 11 and then through conduit 14 to separator 12. Air from which the material has been separated is discharged into the atmosphere outlet or vent 150. Air communicating chamber 132 of the water spray type is provided with an air inlet 46, a battery of spray nozzles 47, as best shown in Fig. 3, and water eliminators 48. Nozzles 47 are supplied with cold water by pump 60, the fluid delivery of said pump being responsive by means of control unit 124 to temperature changes in the discharged air flowing through discharge pipe 150. The feed delivery mechanism is also responsive to discharge air temperature changes as heretofore described with reference to Fig. 1 but for the purpose of simplification, the mechanism is not shown. If the cold water supply is sufficiently cold, the water therefrom is pumped directly to the wash nozzles 47 after which it is discharged through an overflow pipe and not re-circulated; but where the water supply is not cold enough the water may be refrigerated and re-circulated by pump 60 the same as by pump 44 and washer 33 in Fig. 1.

Fig. 4 discloses apparatus adapted to operate on the closed cycle principle without employment of an air washer. The structure is identical with that shown in Fig. 1 and heretofore described with the exception that refrigerating unit 133 replaces both units 32 and 33 of Fig. 1. Means for controlling feed delivery and blower speed in response to air stream temperature changes will preferably be employed, but have been omitted, as in Fig. 2, for the purpose of simplification. It is understood that each of the control means described heretofore are equally applicable to this structure.

I have found that when ordinary pipe, circular in cross section, is employed in the cooling unit 133 that substantial deposits of dust will tend to accumulate on the back side, calling the side first contacted by the air stream the front side. This accumulation is due to the presence of a dead air space along the back of the pipe. These deposits have an insulating effect which results in a substantial retardation of heat transfer from the surrounding air to that portion of the pipe. It follows that if the pipe is so shaped that the air stream in passing, contacts all of its outer surface, no deposits will result, hence, the pipes will be kept clean. Further, a greater amount of heat transfer will take place between the air stream and the fluid flowing through the pipe due to an increased area of pipe surface being contacted by the air stream. Therefore, I prefer to provide pipes of streamlined shape as shown in Fig. 6, the cross sectional shape being such as to closely simulate the natural path of air currents travelling over the pipe. Dead air spaces are eliminated by the use of this steramlined pipe and eddy currents set up by the air stream as it passes thereover are reduced to a minimum. I have found that the air stream is sufficient to keep the pipes of closed circuit, Fig. 2, in a dry condition, hence the dust which might stubbornly stick to their surfaces if wet has no tendency to cling thereto.

In this closed circuit the material is dry and with all atmospheric air excluded in cycle there will be very little, if any, condensation of moisture on the coils and hence, due to their streamlined shape, they will remain clean and be efficient. In dry coil closed circuit, as for example in Fig. 4, it is possible to chill product to a lower degree if desired than with the coil with water spray or with the fluid treated to prevent freezing in cooling unit as in Fig. 1.

Figs. 7 and 8 disclose alternate constructions of my streamlined pipes wherein a conventional pipe 51 of circular cross section is provided with a shroud or jacket 52 which is substantially V-shaped in cross section and has leg portions welded or otherwise secured to the walls of the pipe. Jacket 52 is provided with an axially extending inner fin 53 intermediate the jacket walls. Fin 53 has its outer edge in contact with the outer surface of pipe 51 to provide additional heat flow between the pipe and the jacket. As shown in Fig. 7, a series of radially extending fins 54 may be provided to promote heat flow, in which case axially extending fins 53 may be eliminated if desired. The pipes may be arranged in staggered fashion within chamber 133 as disclosed by the cutaway portion in Fig. 4, or they may be arranged in a manner as disclosed in Fig. 5.

It is, of course, important that the apparatus through which the air stream flows is sufficiently insulated to substantially prohibit heat transfer from the relatively warm outside atmosphere into the cool air stream. This may be accomplished either by individually insulating the various units and conduits comprising the device, or by enclosing the entire device within an insulated compartment.

I claim:

1. A method of regulating the refrigeration of finely divided material to a predetermined uniform temperature, consisting in establishing a flow of fluid refrigerant in a stream delivering the said material into the flowing stream of fluid refrigerant to be refrigerated in direct contact with the stream and regulating the rate of such delivery in accordance with the temperature of at least a portion of the stream at a point beyond the delivery of such material thereto.

2. A method of lowering the temperature of finely divided material, consisting in delivering the material into a stream of fluid refrigerant and regulating the velocity of the stream in accordance with the temperature of the stream at a point beyond the delivery of such material thereto.

3. A method of preserving a finely divided organic material, consisting in commingling the material with a stream of pre-cooled fluid refrigerant and maintaining the stream in continuous circulation from the point of commingling to a point of separation, and regulating both the rate of feed of material at the point of commingling and the speed of refrigerant with reference to the temperature of the stream adjacent the point of separation.

4. A method of cooling comminuted particles of stock food, comprising metering the particles thereof into a pre-cooled gaseous stream to be entrained thereby, transmitting the stream and entrained particles through a conduit to effect a heat flow from the particles to the gas, separating the particles from the stream and storing the particles in packed form to substantially exclude atmospheric heat during storage.

5. A method of cooling comminuted particles of stock food, comprising delivering the heavier and lighter particles thereof into a pre-cooled gaseous stream to be entrained thereby, pneumatically conveying the entrained particles in said stream to effect a heat flow from the particles to the gas, expanding the cross-sectional area of the gaseous stream to retard the rate of flow thereof with a resultant separation of the larger particles from the stream, mechanically conveying the heavier particles to the upper portion of the stream and redelivering them across the stream to prolong their exposure to the stream as compared with the period for which the lighter particles are exposed in their continued pneumatic movement and thereby to reduce their temperature to substantially that of the light particles, and then separating all the particles from the stream.

6. A method of cooling comminuted particles of stock food as set forth in claim 5, including metering the particles into the cooled stream at a rate responsive to temperature changes of the gaseous stream due to absorption of heat units from such particles.

7. A method of cooling comminuted particles of stock food as set forth in claim 5 wherein the velocity of the gaseous stream is governed by the temperature of the stream after refrigeration of the particles substantially to the desired degree.

8. A process of cooling comminuted organic material preparatory to storage thereof, comprising the introduction of said material into a pre-cooled fluid stream, guiding the stream from the point of material introduction through a definite path to a point of separation, separating the material from the stream, discharging the fluid after the material has been separated therefrom, and controlling the rate of material introduction into the stream in response to temperature changes in the fluid discharged.

9. In a device of the character described, the combination with regulating means for feeding comminuted material into a pre-cooled gaseous stream in commingled relation therewith, of means disposed in the stream at a point at which the cooling function of the stream has been performed, said means responsive to temperature changes in the gas resulting from heat transfer from the material to the gas, and means operatively connecting the temperature responsive means to the regulating means to increase the rate of operation of the regulating means in proportion to the temperature response.

10. A process of cooling comminuted organic material preparatory to storage thereof, comprising metering the material into a stream of dry gaseous refrigerant to lower the temperature thereof, separating the cooled material from the gas, re-cooling the gas and simultaneously extracting moisture therefrom by passing the gas over refrigerated surfaces and re-circulating the re-cooled gas to repeat the cycle.

11. Apparatus of the character described including a cooling chamber provided with refrigerating mechanism and adapted to receive atmospheric air and remove heat therefrom, a centrifugal separator spaced from said chamber and connected thereto by a closed fluid conduit, means for circulating air from the cooling chamber to the separator, and means for metering comminuted stock food into the conduit at a point spaced from the separator to be entrained by the air stream and be delivered to the separator to be separated from said stream, whereby heat is extracted from the material during its entrainment within the air stream, means for regulating the air circulating means and means for controlling the operation of the air regulating means in accordance with temperature in the air stream near the separator.

12. A device of the character described having in closed circuit relation, a cooling chamber, a blower, a separator, a dry gas within the circuit and adapted to flow therethrough, means variable as to speed for delivering finely divided feed into the gas between the air cooler and the separator, and a heat responsive device intermediate the separator and the cooling chamber and operatively connected with the delivery means, whereby the rate of delivery into the gas is responsive to temperature changes of the gas between the separator and the cooling chamber.

13. A device of the character described having in closed circuit relation, a cooling chamber, a blower, a separator, a dry gas within the circuit and adapted to flow therethrough, means for expanding the gas to retard the flow thereof between the heat delivery means and the separator, and a heat responsive device intermediate the separator and the cooling chamber and operatively connected with the delivery means, whereby the rate of delivery into the gas is responsive to temperature changes of the gas between the separator and the cooling chamber.

14. A device of the character described having in closed circuit relation, a cooling chamber, a blower, a separator, a dry gas within the circuit and adapted to flow from the cooling chamber to the separator and to be discharged therefrom, means variable as to speed for delivering finely divided feed into the gas between the air cooler and the separator, and a rotatable drum of relatively large cross-sectional area disposed within the circuit between the feed delivery means and the separator and lifting means attached to the inner walls thereof whereby to convey the relatively heavy particles from the bottom of the drum to the top portion thereof and redeliver them into the gaseous stream, whereby the heavy particles fall to the bottom of the drum as the gas expands and are subjected to a longer period of cooling than are the light particles to cool them to approximately the same temperature.

15. A device of the character described having in closed circuit relation, a cooling chamber, a blower, a separator, and a dry gas within the circuit and adapted to flow therethrough, means for re-cooling the gas, said means comprising refrigerating coils so proportioned as to area and temperature as to chill the refrigerating gas without reducing it to the dew point, whereby the coils are maintained free from condensation, and dust entrained in the gas does not cling thereto.

16. A device as set forth in claim 15 provided with streamlined refrigerating coils whereby during operation of the device dust particles will not cling to any portion of the coil surface and eddy currents will be reduced in the passage of gas thereover.

17. A substantially continuous method of regulating the refrigeration of finely divided material to a predetermined uniform temperature, said method consisting in establishing a flow of liquid refrigerant in a defined stream, delivering the said material into the flowing stream of fluid refrigerant to be refrigerated in direct contact with the refrigerant and to receive motion from said stream, and regulating the rate of material delivery to said stream in accordance with the temperature of at least a portion of the stream which has absorbed heat from said material.

18. A method of lowering the temperature of a given material, consisting in exposing the material to the direct action of a stream of fluid refrigrant and regulating the period of exposure of the material to the stream in accordance with the temperature of a portion of the stream which has acted upon said material.

19. A substantially continuous refrigeration method which includes the establishment of a flow of liquid refrigerant in a stream having substantially well defined boundaries, dividing the material to be refrigerated into parts sufficiently small to permit of continuous handling, delivering such material substantially continuously into the said stream of fluid refrigerant within the boundaries thereof, moving said material and agitating it while said material is fully and directly exposed to the fluid refrigerant of said stream, removing the material from the stream at a point remote from the point of delivery of the material to the stream, and regulating the period of pressure of the material to the stream between said points in accordance with the temperature of a portion of the stream which has acted upon said material.

20. A method of refrigeration which includes dividing the material to be refrigerated, establishing a flow of fluid refrigerant in a stream, delivering the material in divided form into the stream in direct contact with the refrigerant to be concurrently chilled and propelled thereby, removing the material from the stream at a predetermined point, and regulating the velocity of the stream between the point of material delivery and the point of material removal in accordance with the temperature of a portion of the stream which has been exposed to said material.

21. A method of lowering the temperature of small particles of material, such method consisting in establishing a stream of fluid refrigerant, delivering to such stream the small particles of material to be refrigerated, and using the energy of the stream of refrigerant to advance the material while the material gives up its heat to the refrigerant.

22. A method of refrigerating finely divided material, which method consists in propelling a gaseous refrigerant in a stream, introducing into such stream the finely divided material to be refrigerated, pneumatically propelling such material in said stream while abstracting heat therefrom by direct contact of the material with the stream of refrigerant, whereby it is pneumatically conveyed, and separating the material and said stream.

23. A method of cooling food in small particles, which comprises the propulsion of gas in a stream, the refrigeration of the gas of said stream, and the introduction into the stream of particles of food to be refrigerated, the propulsion of the refrigerated gas in such stream being conducted at such a rate with reference to the characteristics of the particles of food as to have sufficient energy to advance such particles of food along the path of movement of said stream while receiving heat from such particles by direct contact therewith.

24. A method of cooling food in small particles, such method comprising the propulsion of gas in a stream, the refrigeration of the gas of said stream, the introduction of particles of food into the previously refrigerated gas of said stream, the propulsion of gas in the stream being conducted at such a rate with reference to the size and weight of the food particles as to pneumatically convey such particles with the stream while the gas of the stream is abstracting heat from such particles, the separation of the gas stream and the particles, and the storage of the cooled food particles in closely packed masses.

25. A method of cooling small particles of food, which method comprises refrigerating a gas, the introduction of the food particles into refrigerated gas, the circulation of the refrigerated gas in a stream at a rate such as to entrain the food particles for pneumatic convection thereof during the chilling of such particles by the gas in which it is pneumatically conveyed, the separation of the chilled food particles from the stream of gas, and the regulation of at least one of the foregoing operations to produce an approximately uniformly cooled product.

26. In a device of the character described, the combination with means defining a path for a fluid current, of means for propelling fluid in a current through said path-defining means, a refrigerator to which the fluid of said current is exposed whereby such fluid is chilled, and means for introducing into the fluid of said current particles of material sufficiently light to be advanced by said current while cooled by direct contact with said fluid.

27. In a device of the character described, the combination with a conduit for gas, of an air cooler arranged to deliver cooled gas to said conduit, means for establishing a current of cooled gas through said conduit at a speed sufficient to entrain particles of material delivered into the gas to be propelled and cooled thereby, a feeder adapted and positioned to deliver into the current of gas in said conduit material in sufficiently light form to be advanced by the gas current in said conduit while cooled by direct contact with the gas of said current, and means with which said conduit communicates for separating the cooled material from the gas.

28. The apparatus set forth in claim 27 in which the means for propelling gas through the conduit operates at such a rate with respect to the characteristics of the material to be cooled that the current of gas is adapted to entrain such material for its pneumatic propulsion in the conduit while being cooled, said conduit and separating means together providing for sufficient length of convection travel of the material with the gas to effect the cooling of such material.

29. A pneumatic refrigerating and conveying system comprising an air cooler, a gas conduit, a separator, and a blower, in appropriate series order, said blower comprising means for propelling through the conduit and separator gas chilled in said cooler at such a rate as to impart its energy to finely divided particles for the pneumatic propulsion thereof through said system while cooling such particles, together with a feeder in operative connection with said system for delivering particles of material into the path of gas in said system in said conduit in advance of said blower, the path of travel in said system between said feeder and the point of separation of the gas from said material in said separator being sufficient to effect required cooling of the material in direct contact with the gaseous current whereby it is conveyed and cooled.

30. A method of lowering the temperature of small particles of material, such method consisting in establishing a stream of fluid refrigerant, delivering to such stream the small particles of material to be refrigerated, and using the energy of the stream of refrigerant to advance the material while the material gives up its heat to the refrigerant, separating the material from the stream, recirculating the stream in a closed refrigerant circuit, and removing heat from the refrigerant stream in the course of its closed circuit movement.

31. A method of lowering the temperature of small particles of material, such method consisting in establishing a stream of fluid refrigerant, delivering to such stream the small particles of material to be refrigerated, and using the energy of the stream of refrigerant to entrain and pneumatically convey the material while the material gives up its heat to the refrigerant, using the energy of the stream to effect centrifugal separation from the stream of the material conveyed thereby, re-circulating the stream in a closed refrigerant circuit, and removing heat from the refrigerant in the course of its recirculation after separating the material therefrom and before adding material thereto.

32. A device for cooling material in a stream of refrigerant, said device having in closed circuit relation in appropriate series order, the combination of a cooling chamber for circulatory fluid refrigerant; means for circulating a stream of fluid refrigerant; a separator for removing the cooled material from the stream of fluid refrigerant; operative closed circuit conduit connections between said chamber, said circulating means and said separator; means for introducing into said device material to be advanced by the energy of said stream; and means in said chamber for removing from the stream heat derived from said material, said means comprising refrigerating coils so proportioned as to area and temperature as to chill the refrigerating gas without reducing it to the dew point, whereby the coils are maintained free from condensation, and dust entrained in the gas does not cling thereto.

33. The device of claim 32 in which the series order in the closed circuit conduit connections requires the stream of refrigerant to pass through the cooling chamber after leaving the separator and before passing the means for introducing material into said stream, and the separator comprises a centrifugal separator using the energy of the stream for the separation therefrom of the material advanced thereby, and the circulating means has sufficient energy in relation to the material advanced by said stream to provide for the pneumatic convection of said material entrained with the stream and for the centrifugal separation of such material.

GERALD D. ARNOLD.